United States Patent [19]
Shaffer et al.

[11] 3,837,281
[45] Sept. 24, 1974

[54] THERMAL RADIATION EMITTER

[75] Inventors: Donald Edward Shaffer, Newark, Del.; Herbert W. D. Cassidy, Elkton, Md.; Walter G. Andrews, Wilmington, Del.

[73] Assignee: Thiokol Chemical Corporation, Bristol, Pa.

[22] Filed: Apr. 25, 1969

[21] Appl. No.: 823,234

[52] U.S. Cl. ............... 102/35, 102/35.4, 102/37.1, 102/37.8, 244/31
[51] Int. Cl. ........................... B64b 1/44, B64b 1/62
[58] Field of Search ............... 250/84, 85, 86, 88; 102/37.1, 37.8, 35, 35.4; 244/31; 343/18 B

[56] References Cited
UNITED STATES PATENTS

| | | | |
|---|---|---|---|
| 2,525,638 | 10/1950 | Blout et al. | 250/86 X |
| 2,619,303 | 11/1952 | Martin | 343/18 B X |
| 2,972,053 | 2/1961 | Anderson | 250/85 |
| 2,996,212 | 8/1961 | O'Sullivan, Jr. | 343/18 B X |
| 3,001,196 | 9/1961 | McIlroy et al. | 343/18 B X |
| 3,152,777 | 10/1964 | McLean | 244/31 X |
| 3,410,559 | 11/1968 | Miller, Jr. et al. | 250/85 X |
| 3,478,687 | 11/1969 | Craig | 102/35 |
| 3,485,169 | 12/1969 | Lai | 102/37.8 |
| 3,508,724 | 4/1970 | Scher et al. | 244/31 |
| 3,514,605 | 5/1970 | Cronk et al. | 250/85 |

*Primary Examiner*—Malcolm F. Hubler
*Attorney, Agent, or Firm*—William R. Wright, Jr.

[57] ABSTRACT

A device is presented which emits infra heat rays at specific predetermined wave lengths and defines a particular cross sectional pattern of such heat emission so that the emission source can be both detected and identified by an infra red detector. A hot gas generant is employed to inflate a balloon of known cross section having a surface which is known to emit infra red heat rays within a certain selected range of wave lengths.

3 Claims, 3 Drawing Figures

Donald E. Shaffer
Herbert W.D. Cassidy
Walter G. Andrews
INVENTORS

Donald E. Shaffer
Herbert W. D. Cassidy
Walter G. Andrews
INVENTORS

THERMAL RADIATION EMITTER

The present invention relates to a device for emitting radiant infra-red heat within certain selected wave length bands (thermal signature) and which represents a definite cross sectional or projected area of emission when viewed by an infra-red detector.

Infra-red detectors are useful for the purpose of detecting and locating sources of heat by responding to the infra-red heat which is emitted by the source. Furthermore, the physical size of the source of heat is often a good means of identifying the object and its measurement is obtainable by scanning movement of the detector, estimation of its distance from the heat source and measurement of the detector's angularity of movement. It is apparent therefore, that a heat source which not only emits infrared radiant heat but at the same time presents a particular, predetermined cross sectional or projected area to the detector's "view" becomes very useful in the calibration of such detectors. In addition to this, a heat emitter which emits infra-red heat on a particular predetermined wave length is useful in the calibration of an infra-red detector designed for heat detection on that particular wave length. Another particular use for the present invention is as an infra-red heat source which can be put into operation by the occupants of a downed and disabled aircraft to direct search and rescue planes having infra red detectors aboard to the location of the downed aircraft.

The present invention provides a solution to the problem of providing a suitable heat source by the inclusion of means to accomplish all of the foregoing in a relatively simple and practical device which is easily used and capable of manufacture and yet is very effective for its purpose.

It is, therefore, an object of the present invention to provide a thermal infra red radiation emitter which is portable, quick-acting and of high output for the amount of thermal energy input.

It is also an object of the present invention to provide a device of the foregoing type in which the emission of thermal radiation is accurately controlled within selected wave lengths.

It is also an object of the present invention to provide a device of the foregoing type in which the pattern of infra red heat emission is of a definite and predetermined projected or cross sectional area when viewed by an infra red detector.

It is also an object of the present invention to provide a device of the foregoing type in which a hot gas is the heat source.

It is also an object of the present invention to provide a device of the foregoing type in which the hot gas is provided by the combustion of either solid or liquid fuels.

Figure 1:
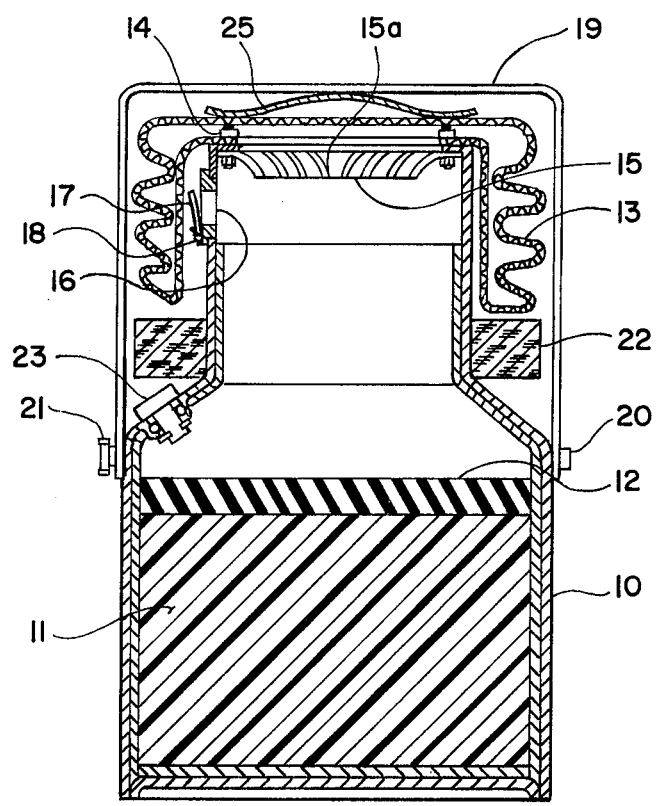
FIG. 1 is a cross sectional view of the entire emitter as it appears in its storage condition with the balloon folded and the cover in place.
Figure 3:
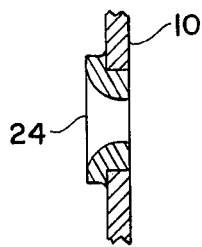

FIG. 3 a partial view of the canister wall showing a calibrated orifice in place in the wall as an alternate to the flapper valve shown in FIG. 1.

In the preferred embodiment of the present invention, a gas generator emits hot gas into an erectable or expansible container or balloon which then expands as the pressure within it increases and assumes a predetermined size defining a particular cross-sectional area and emitting infra heat at a particular wave length detectable by infra-red heat detection equipment.

With reference to FIG. 1 of the drawings, a canister or housing 10 contains, in its lower portion, a gas generating material comprising a hot gas generator inflating composition or compound 12 and a sustain composition or compound 11. These compositions can be basically of ammonium perchlorate with inhibitors added along with other materials to make the inflating composition burn at a lower temperature than the sustaining composition for reasons to be explained later.

At the top of canister 10, an erectable or expansible member or balloon 13 is attached having communication with the gas generator but otherwise is a completely closed bag or balloon. This balloon 13 is constructed of material of a substantially non-stretchable nature and is preferably spherical in shape although other shapes can be used if desired. It is initially folded and packed in place in the upper portion of canister 10 and is attached to the upper rim of canister 10 by a ring 14 held to the flanged upper rim 10a of canister 10 by through bolts or other suitable fasteners. Ring 14 acts as a clamp and its action results in a seal between the balloon 13 and canister 10 so that little or no leakage can take place. The upper end or top of canister 10 is open to the interior of balloon 13 but an open grid 15 having gas deflecting vanes 15a is interposed across the opening in the manner shown.

Adjacent to the upper rim of canister 10 below the entrance to the balloon 13 but above the gas generating compounds is a pressure control valve comprising an aperture 16 through the wall of canister 10 covered by a cover or plate 17 spring biased against the outside of the aperture by a calibrated coil spring 18 and hinged at one side at its outer edge as shown. The plate 17 normally covers the entire aperture in a substantially leak-proof manner but when the internal gas pressure becomes too high, the force of spring 18 is overcome by the pressure force on the plate 17 and it is moved about its hinge point to uncover the aperture enough to relieve the pressure. The extent of the pressure relief is determined by the stiffness of the spring and size of the aperture and is calibrated to operate at the correct pressure value prior to its installation in the wall of the canister 10.

A cover 19 fits over the top of canister 10 defining an enclosed space for balloon 13 in its folded or collapsed condition and providing protection for it. A spring-loaded clamp or release collar 20 is adapted to hold cover 19 in place tightly to canister 10 but is arranged to be released quickly by a remote initiation signal which causes severance of an explosive bolt 21 which has been holding the clamp in place thus allowing the spring-loaded clamp 20 to open up away from the cover. This action frees the cover from its position on canister 10 and it is moved upward and away from the top of it by leaf or spider spring 25 thus exposing and freeing the balloon 13 and exposing flotation ring 22.

An igniter 23 is provided and is located just above the surface of the gas generating compound 12 as shown. It is ordinarily adapted to be actuated by a mechanical timer (not shown) although a manual trigger or remote electronic means can be used for this purpose.

Figure 2:
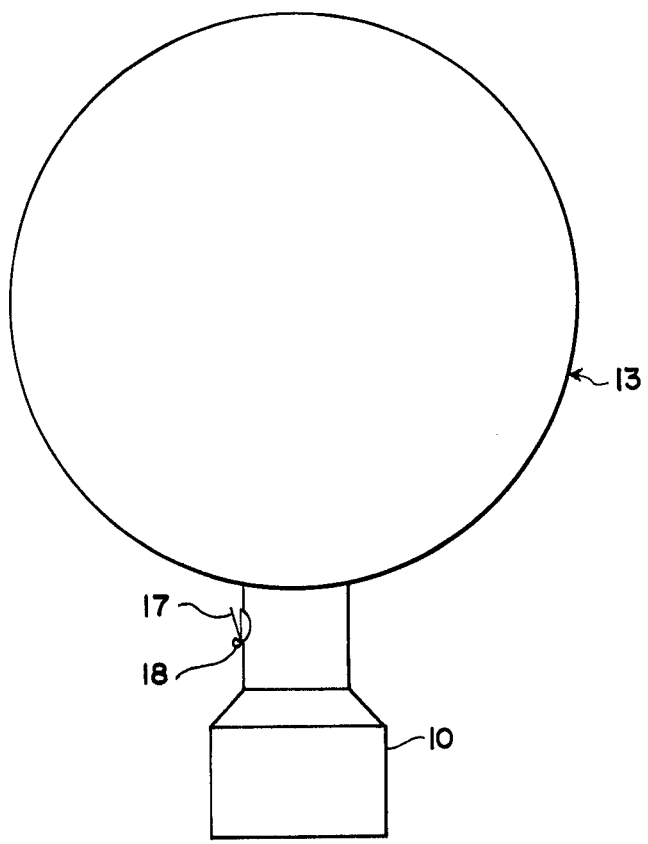
FIG. 2 is an exterior view showing the balloon in its inflated condition.

In operation, the cover 19 is released by the remote severing of the explosive bolt 21 holding spring clamp 20 in place and it moves up and away from canister 10 under the urging of spring 25. When cover 19 has been removed, igniter 23 is caused to operate by actuation of the timer or otherwise and it produces a flame which impinges upon gas generating inflation compound 12 and ignites it. As inflation compound 12 burns, it rapidly produces a sufficient quantity of hot gas to fill balloon 13 and to cause it to inflate to its maximum size as shown in FIG. 2. Once the balloon is inflated its size remains substantially the same since the material of its wall does not stretch to any appreciable extent, and thus, the diameter of the balloon is determined and its cross-sectional area remains essentially constant so long as the inflation pressure is maintained. This is accomplished for a considerable period of time by the burning of the sustain compound 11 which automatically commences to burn upon the exhaustion of the inflation compound 12, its ignition taking place from the heat of combustion of the last of the inflation compound. As the sustain compound 11 burns it furnishes new heated quantities of gas to the interior of the balloon 13 both to maintain the correct inflation pressure and to supply additional heat to maintain the correct temperature (determined by the size of the balloon, the materials used and its ultimate purpose) of the balloon's skin by supplanting the heat emitted by the balloon. The inflation pressure is needed to maintain the shape of balloon 13 and normally is very slightly over atmospheric pressure. It is important, however, that the pressure within the balloon be maintained at a substantially constant level in order that the balloon may not become over or under inflated and so that its heat emission characteristics and size and shape will not be interfered with. Provision for pressure relief has been provided and includes a spring-loaded flapper valve 16, 17, 18 covering an aperture 16 in the upper wall of canister 10 as previously described. When the pressure exceeds the normally desired pressure, the pressure force on flapper 17 becomes great enough to overcome the force of its spring 18 and it lifts from aperture 16, rotating about its hinge line as it does so. As this occurs, gas passes through aperture 16 and relieves the pressure within canister 10 and the balloon 13. When the pressure has dropped to the normal level once again the flapper 17 is pushed by the spring 18 back over aperture 16 to cover it and thus preclude further leakage. The balloon pressure is thus regulated at all times while gas is being generated and the balloon stays in a fully inflated condition until the gas generating compounds are fully consumed after which the gases lose their pressure as their heat is emitted and the balloon gradually collapses presumably having served it purpose.

The open grid 15 with its deflecting vanes 15a is provided for the purpose of directing hot gas from the gas generating compound outward toward all inner surfaces of the balloon 13 rather than to allow it to all pass directly to the top of the balloon as would be the case without the vanes. In this manner, a more even distribution of heat is achieved over the entire balloon surface.

As the inner surface of the balloon 13 becomes heated, heat passes through the material of the balloon and infra red rays are emitted from the exterior surface at a certain wave length depending upon the particular material used and upon the temperature of the gases at the inner surface of the balloon 13. Accordingly the selection of particular balloon material having the quality of proper infra red emission, sufficient flexibility to permit reasonably folded storage, non-flammability at the temperatures involved as well as resistance to charring or other break down due to the high temperature, becomes of great importance to the proper and effective operation of the device. Materials particularly suitable for this purpose are to be found in the family of fabrics woven of glass or quartz fibers. Also, it is desirable but not essential that the material be black in color on the inner surface of the balloon and this can be accomplished by the application of lamp black or other carbonaceous material to the inner surface.

The flotation ring 22 is provided for the purpose of supporting the device on the surface of water if it should be used in that medium. The ring 22 can be made of expanded polystyrene or polyurethane or other suitable flotation material.

For the useful wave length band of 8 through 14 microns at 1000°F, the following ratio is the amount of energy radiated divided by the total amount of energy emitted. This is used to select the material for the balloon for some specific purpose falling within the above range. one or more of these compounds can be used to give the desired effect. The selection chart is as follows:

Theoretical Efficiencey of Candidate Materials
Theoretical Efficiency at 1000 F in Per Cent %

| | | |
|---|---|---|
| $Si O_2$ | Silicon dioxide | 16.0 |
| $Ti O_2$ | Titanium dioxide | 20 |
| $Al_2 O_3$ | Aluminum oxide | 23 |
| $Ba O$ | Barium oxide | 24 |
| $Y_2 O_3$ | Yttrium oxide | 31 |
| $Zr O_2$ | Zirconium dioxide | 32 |
| $Th O$ | Thorium oxide | 46 |
| $Mg O$ | Magnesium oxide | 42 |

While the gas generant that has been described is of the solid type, a liquid type generator can also be employed if that is desired. In that instance, the gas generating material can either be of the monopropellant type in which the fuel and oxidizer are included in one liquid or of the bi-propellant type in which the fuel and oxidizer are separate until they are burned. Other fuels, gaseous solid or liquid can be used. In any event, the fuel is burned and hot gas is produced and is utilized in the present invention in the same manner as previously described for the solid gas generants. Liquid burners of this sort are generally well known in the rocket and combustion arts and thus need not be shown here in greater detail than just described.

What is claimed is:

1. A thermal infra red emitter source comprising in combination, an inflatable closed balloon, means for supplying hot gas to the interior thereof, a regulator for the pressure of the hot gas contained in said balloon, means for initiating the supply of hot gas to said balloon and the balloon comprising a material coated with a compound selected from the group comprising titanium dioxide, zirconium dioxide, barium oxide, thorium oxide, strontium oxide, and yttrium oxide.

2. The invention set forth in claim 1 with the balloon comprising woven glass fiber cloth.

3. The invention set forth in claim 1 with the balloon comprising woven quartz fiber cloth.

* * * * *